United States Patent
Otake et al.

(10) Patent No.: US 10,000,236 B2
(45) Date of Patent: Jun. 19, 2018

(54) VEHICLE CONTROL DEVICE

(71) Applicant: TOYOTA JIDOSHA KABUSHIKI KAISHA, Toyota-shi, Aichi-ken (JP)

(72) Inventors: Hirotada Otake, Susono (JP); Masaki Takano, Susono (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days. days.

(21) Appl. No.: 15/661,569

(22) Filed: Jul. 27, 2017

(65) Prior Publication Data

US 2018/0037260 A1 Feb. 8, 2018

(30) Foreign Application Priority Data

Aug. 4, 2016 (JP) ................................ 2016-153580

(51) Int. Cl.
*B62D 15/02* (2006.01)
*G05D 1/00* (2006.01)
(Continued)

(52) U.S. Cl.
CPC ......... *B62D 15/025* (2013.01); *G05D 1/0055* (2013.01); *G05D 1/0212* (2013.01);
(Continued)

(58) Field of Classification Search
CPC ........ B62D 15/025; B62D 6/08; G08G 1/167; G05D 1/0055; G05D 1/0212; G05D 1/0257; G05D 2201/0213
(Continued)

(56) References Cited

U.S. PATENT DOCUMENTS 6,212,453 B1 * 4/2001 Kawagoe ............. B62D 5/0463
                                                180/443
7,038,577 B2 * 5/2006 Pawlicki ............ B60K 31/0008
                                                340/435
(Continued)

FOREIGN PATENT DOCUMENTS

JP     2005-214479    *  7/2005    ........... B62D 15/025
JP     2006-090183    *  3/2006    ........... B62D 15/029
(Continued)

OTHER PUBLICATIONS

Design of a High-Performance Automatic Steering Controller for Bus Revenue Service Based on How Drivers Steer Han-Shue Tan; Jihua Huang; IEEE Transactions on Robotics; Year: 2014, vol. 30, Issue: 5;pp. 1137-1147.*

(Continued)

*Primary Examiner* — Cuong H Nguyen
(74) *Attorney, Agent, or Firm* — Sughrue Mion, PLLC

(57) ABSTRACT

Abnormality determination for a driver is appropriately made in accordance with a peripheral state when lane keeping assist control is being carried out. When a no-driving operation state has continued for a period equal to or more than a set period, a driving support ECU determines whether or not a change inhibition condition set in advance in relation to a peripheral state of an own vehicle is satisfied. When the change inhibition condition is not satisfied, the driving support ECU sets a control mode of LKA to a "weaker mode" to decrease a control amount of the LKA. As a result, the own vehicle swerves in a lane, and a driver who has not fallen into an abnormal state can be prompted to carry out a steering wheel operation. Thus, it is possible to discriminate a driver who has fallen into the abnormal state and a driver who has not fallen into the abnormal state from one another. When the change inhibition condition is satis- (Continued)

fied, the driving support ECU sets the control mode of the LKA to a "normal mode".

8 Claims, 7 Drawing Sheets

(51) Int. Cl.
  *G08G 1/16* (2006.01)
  *G05D 1/02* (2006.01)
  *B62D 6/08* (2006.01)
(52) U.S. Cl.
  CPC .............. *G08G 1/167* (2013.01); *B62D 6/08* (2013.01); *G05D 1/0257* (2013.01); *G05D 2201/0213* (2013.01)
(58) Field of Classification Search
  USPC ................ 701/23, 41, 116, 301; 340/435
  See application file for complete search history.

(56) References Cited

U.S. PATENT DOCUMENTS

| | | | | |
|---|---|---|---|---|
| 7,463,138 | B2* | 12/2008 | Pawlicki | B60K 31/0008 340/435 |
| 7,679,498 | B2* | 3/2010 | Pawlicki | B60K 31/0008 340/435 |
| 7,890,231 | B2* | 2/2011 | Saito | B62D 1/28 701/301 |
| 8,055,409 | B2* | 11/2011 | Tsuchiya | B62D 1/286 701/1 |
| 8,170,751 | B2* | 5/2012 | Lee | B62D 15/025 180/204 |
| 8,289,142 | B2* | 10/2012 | Pawlicki | G06T 7/13 340/435 |
| 8,457,868 | B2* | 6/2013 | Tange | B60W 30/12 701/116 |
| 8,577,515 | B2* | 11/2013 | Kobayashi | B60T 7/22 701/1 |
| 2006/0025918 | A1 | 2/2006 | Saeki | |
| 2006/0206243 | A1* | 9/2006 | Pawlicki | B60K 31/0008 701/1 |
| 2007/0021889 | A1* | 1/2007 | Tsuchiya | B62D 1/286 701/41 |
| 2007/0233343 | A1* | 10/2007 | Saito | B62D 1/28 701/41 |
| 2011/0015850 | A1* | 1/2011 | Tange | B60W 30/12 701/116 |
| 2012/0166017 | A1* | 6/2012 | Kobayashi | B60T 7/22 701/1 |
| 2012/0197496 | A1* | 8/2012 | Limpibunterng | B62D 1/286 701/42 |
| 2013/0253767 | A1* | 9/2013 | Lee | B60W 50/04 701/42 |
| 2015/0291216 | A1* | 10/2015 | Sato | B60W 50/14 701/23 |
| 2015/0329108 | A1* | 11/2015 | Kodaira | B62D 15/025 701/41 |
| 2015/0344068 | A1* | 12/2015 | Taniguchi | B62D 15/025 701/41 |
| 2016/0046288 | A1* | 2/2016 | Pawlicki | B60K 31/0008 701/41 |
| 2016/0107687 | A1* | 4/2016 | Yamaoka | B62D 15/0255 701/41 |
| 2016/0129938 | A1* | 5/2016 | Okuda | B60W 50/10 701/41 |

FOREIGN PATENT DOCUMENTS

| | | | | |
|---|---|---|---|---|
| JP | 2006-315491 | A | | 11/2006 |
| JP | 2008-195402 | A | | 8/2008 |
| JP | 4172434 | B2 | | 10/2008 |
| JP | 2009-073462 | A | | 4/2009 |
| JP | 2009-190464 | A | | 8/2009 |
| JP | 4349210 | B2 | | 10/2009 |
| JP | 2010-006279 | A | | 1/2010 |
| JP | 4929777 | B2 | | 5/2012 |
| JP | 2013-152700 | A | | 8/2013 |
| JP | 2014-148293 | A | | 8/2014 |
| WO | WO2011/007835 | | * | 3/2012 .......... B60T 2210/32 |

OTHER PUBLICATIONS

Simultaneous Localization and Mapping for Path-Constrained Motion Carsten Hasberg; Stefan Hensel; Christoph Stiller IEEE Transactions on Intelligent Transportation Systems; Year: 2012, vol. 13, Issue: 2; pp. 541-552.*

Toward Autonomous Collision Avoidance by Steering Andreas Eidehall; Jochen Pohl; Fredrik Gustafsson; Jonas Ekmark IEEE Transactions on Intelligent Transportation Systems; year 2007, vol. 8, isssue 1, pp. 84-94.*

* cited by examiner

VEHICLE CONTROL DEVICE

BACKGROUND OF THE INVENTION

1. Field of the Invention

The present invention relates to a vehicle control device configured to handle a case where a driver falls into an abnormal state where the driver has lost capability to drive a vehicle.

2. Description of the Related Art

Hitherto, there have been proposed devices configured to determine whether or not the driver has fallen into the abnormal state where the driver has lost the capability to drive the vehicle (e.g., a drowsy driving state and a state where bodily functions have stopped) and decelerate the vehicle when such determination is made (for example, refer to Japanese Patent Application Laid-open No. 2009-73462).

The "abnormal state where the driver has lost the capability to drive the vehicle" is hereinafter also simply referred to as "abnormal state", and the "determination of whether or not the driver is in the abnormal state" is hereinafter also simply referred to as "abnormality determination for the driver".

For example, the abnormality determination for the driver may be made based on presence/absence of a driving operation of the driver. However, when driving support control for supporting the driving operation of the driver is being carried out, it is difficult to make the abnormality determination based only on the presence/absence of the driving operation of the driver. Therefore, the inventor(s) of the present application has (have) invented a method of making the abnormality determination for the driver by changing a travel state of the vehicle to generate a travel state undesirable for the driver, and detecting presence/absence of a reaction of the driver in this travel state. In other words, when some reaction of the driver is detected as a result of the change in the travel state, this method determines that the driver is not in the abnormal state. Conversely, when a reaction of the driver is not detected, this method determines that the driver is in the abnormal state.

As one type of the driving support control, lane keeping assist control of causing an own vehicle to travel along a target travel line is known. Therefore, while the lane keeping assist control is being carried out, when a control amount thereof (lane keeping assist control amount) is changed so that a travel position of the own vehicle is likely to deviate from the target travel line desirable for the driver, the driver who has not fallen into the abnormal state is considered to react in some way to the change in the travel state (deviation of the travel position of the own vehicle from the target travel line).

However, when the lane keeping assist control amount is changed, lane keeping assist performance decreases, which may not be preferred in terms of safety depending on peripheral states of the own vehicle (a state of the road and a state of other peripheral vehicles). For example, when the lane keeping assist performance is decreased under a specific state such as a state where a curve of the road is sharp, a state where the width of the road is narrow, or a state where a large number of other vehicles exist in a periphery of the own vehicle, the decrease in lane keeping assist performance may cause some trouble. Specifically, for example, the own vehicle may deviate to the outside of the lane, or may abnormally approach another vehicle.

SUMMARY OF THE INVENTION

The present invention has been made in view of the above-mentioned problem, and has an object to carry out abnormality determination for a driver appropriately in accordance with a peripheral state.

In order to attain the above-mentioned object, a feature of a vehicle control device according to one embodiment of the present invention resides in that the vehicle control device includes:

lane keeping assist means (10 and 60) for recognizing a road ahead of an own vehicle to set a target travel line (Ld), calculating a lane keeping assist control amount ($\theta$LKA*) for carrying out driving support for a driver so that the own vehicle travels along the target travel line, and carrying out steering control for the own vehicle based on the lane keeping assist control amount;

control amount change means (10, Step S12, Step S15, and Step S24) for changing the lane keeping assist control amount so as to decrease lane keeping assist performance, which is performance of causing the own vehicle to travel along the target travel line, when such a set event set in advance that the driver is suspected to be in an abnormal state is detected (Yes in Step S12);

reaction detection means (10 and Step S17) for detecting a reaction of the driver after the lane keeping assist control amount is changed;

abnormality-time driving control means (10 and Step S18) for carrying out, when the reaction of the driver is not detected by the reaction detection means, abnormality-time driving control, which is driving control for risk avoidance based on an assumption that the driver is in the abnormal state; and control amount change inhibition means (10, Step S13, Step S14, Step S16, Step S21, and Step S22) for acquiring peripheral state information on the own vehicle, determining whether or not a change inhibition condition set in advance in relation to a peripheral state of the own vehicle is satisfied based on the peripheral state information, and inhibiting the control amount change means from changing the lane keeping assist control amount so as to decrease the lane keeping assist performance when the change inhibition condition is satisfied.

According to the one embodiment of the present invention, the lane keeping assist means recognizes the road ahead of the own vehicle to set the target travel line, calculates the lane keeping assist control amount for carrying out driving support for the driver so that the own vehicle travels along the target travel line, and carries out steering control for the vehicle based on the lane keeping assist control amount.

The control amount change means is configured to change the lane keeping assist control amount so as to decrease the lane keeping assist performance, which is the performance of causing the own vehicle to travel along the target travel line, when such a set event that the driver is suspected to be in the abnormal state is detected. The set event is such an event set in advance that the driver is suspected to be in the abnormal state, and may be arbitrarily set.

For example, such an event that a state where a driving operation of the driver is not detected continues for a period equal to or more than a set period may be set as the set event. In addition, for example, so-called "driver monitoring technology" disclosed in Japanese Patent Application Laid-open No. 2013-152700 and the like may be employed, and a state where the line of sight or the face of the driver is kept for a period equal to or more than a set period toward a direction toward which the line of sight or the face is not directed for a long period during the normal driving of the vehicle may be set as the set event. Alternatively, for example, a state where the driver does not carry out a depression operation on a confirmation button even when the driver is prompted to carry out the depression operation on the confirmation button continues for a period equal to or more than a set period may be set as the set event.

When the lane keeping assist control amount is changed by the control amount change means so that the lane keeping assist performance decreases, the own vehicle no longer travels along the travel line desirable for the driver. Unless the driver is not in the abnormal state where the driver has lost capability to drive the vehicle, the driver reacts in some way to such a change in the travel state of the own vehicle.

For example, the driver carries out a steering wheel operation or a pedal operation (an accelerator operation or a brake operation), or directs the face, which has been directed away, toward the front direction. When such a reaction of the driver does not exist, the driver can be predicted to be in the abnormal state. Thus, the abnormality determination for the driver can be made based on the presence/absence of the reaction (response) of the driver.

Thus, the reaction detection means is configured to detect the reaction of the driver after the lane keeping assist control amount is changed. The abnormality-time driving control means is configured to carry out the abnormality-time driving control, which is the driving control for risk avoidance on the assumption that the driver is in the abnormal state, when the reaction of the driver is not detected by the reaction detection means. For example, the abnormality-time driving control means is configured to carry out, as the abnormality-time driving control, deceleration control of decelerating the own vehicle at a predetermined deceleration so as to stop the own vehicle.

Incidentally, when the lane keeping assist performance is decreased to detect the reaction of the driver, the decrease may not be preferred in terms of safety depending on a peripheral state of the own vehicle (the state of the road and the state of other peripheral vehicles). Thus, the control amount change inhibition means is configured to acquire the peripheral state information on the own vehicle, and determine whether or not the change inhibition condition set in advance in relation to the peripheral state of the own vehicle is satisfied based on the peripheral state information. Then, the control amount change inhibition means inhibits the control amount change means from changing the lane keeping assist control amount so as to decrease the lane keeping assist performance when the change inhibition condition is satisfied.

As a result, according to the present invention, the abnormality determination for the driver can be appropriately made in accordance with the peripheral state.

A feature of one embodiment of the present invention resides in that the control amount change means is configured to finish (No in Step S17, and Step S11) changing the lane keeping assist control amount when the reaction of the driver is detected by the reaction detection means after the lane keeping assist control amount is changed.

When the reaction of the driver is detected by the reaction detection means after the lane keeping assist control amount is changed, the driver can be predicted not to be in the abnormal state. According to the one embodiment of the present invention, when the driver can be predicted not to be in the abnormal state, the change in the lane keeping assist control amount is finished. In other words, the lane keeping assist performance is restored to the original performance. Thus, the driver can again receive the original lane keeping assistance.

A feature of one embodiment of the present invention resides in that the peripheral state information includes information representing a curvature radius (R) of a lane in which the own vehicle travels; and the change inhibition condition is set to a condition that the curvature radius of the lane in which the own vehicle travels is less than a threshold value.

When the lane (travel lane) in which the own vehicle travels is a sharp curve, and the lane keeping assist performance is decreased, the own vehicle may deviate from the lane. Thus, according to the one embodiment of the present invention, the control amount change inhibition means is configured to acquire the information representing the curvature radius of the lane in which the own vehicle travels as the peripheral state information, and, when the curvature radius of the lane in which the own vehicle travels is less than the threshold value, inhibit the control amount change means from changing the lane keeping assist control amount so that the lane keeping assist performance decreases. Thus, occurrence of such a trouble that the own vehicle cannot appropriately travel while turning at the curve due to the abnormality determination for the driver can be suppressed. The information representing the curvature radius does not mean only the curvature radius, and may be a parameter from which the curvature radius can be derived, for example, information representing the curvature (=1/curvature radius).

A feature of one embodiment of the present invention resides in that: the peripheral state information includes information representing a distance (W) between left and right white lines of the lane in which the own vehicle travels; and the change inhibition condition is set to a condition that the distance between the left and right white lines of the lane in which the own vehicle travels is less than a threshold value.

When the distance between the left and right white lines of the lane in which the own vehicle travels is short, and the lane keeping assist performance is decreased, the own vehicle may deviate from the lane. Thus, according to the one embodiment of the present invention, the control amount change inhibition means is configured to acquire the information representing the distance between the left and right white lines of the lane in which the own vehicle travels as the peripheral state information, and inhibit the control amount change means from changing the lane keeping assist control amount so that the lane keeping assist performance decreases when the distance between the left and right white lines of the lane in which the own vehicle travels is less than the threshold value. Thus, occurrence of such a trouble that the own vehicle deviates outside of the lane due to the abnormality determination for the driver can be suppressed.

A feature of one embodiment of the present invention resides in that: the peripheral state information includes another vehicle information, which is information that enables prediction of whether or not another vehicle exists to a side of the own vehicle; and the change inhibition condition is set to a condition that another vehicle is predicted to exist to the side of the own vehicle.

When another vehicle exists to the side of the own vehicle, and the lane keeping assist performance is decreased, the own vehicle may abnormally approach another vehicle. Thus, according to the one embodiment of the present invention, the control amount change inhibition means is configured to acquire the information that enables prediction of whether or not another vehicle exists to the side of the own vehicle as the peripheral state information, and inhibit the control amount change means from changing the lane keeping assist control amount so that the lane keeping assist performance decreases when another vehicle is predicted to exist to the side of the own vehicle. Thus, occurrence of such a trouble that the own vehicle abnormally approaches another vehicle due to the abnormality determination for the driver can be suppressed.

As the information that enables prediction of whether or not another vehicle exists to the side of the own vehicle, other vehicle position information, which is a result of directly detecting the position of another vehicle existing in the periphery of the own vehicle, information that enables determination that another vehicle is highly likely to exist to the side of the own vehicle without directly detecting the position of the another vehicle, for example, traffic congestion information, may be used.

A feature of one embodiment of the present invention resides in that the control amount change means is configured to decrease (Step S15), when the set event is detected, the lane keeping assist control amount with respect to the lane keeping assist control amount before the set event is detected.

According to the one embodiment of the present invention, the control amount change means is configured to decrease, when the set event is detected, the lane keeping assist control amount with respect to the lane keeping assist control amount before the set event is detected. For example, the control amount change means changes a calculation equation for the lane keeping assist control amount so as to decrease the lane keeping assist control amount. As a result, the own vehicle is likely to deviate from the target travel line, and swerves in a lateral direction in the lane. Thus, the driver who has not lost the driving capability reacts in some way to the change in the travel state of the own vehicle. As a result, the abnormality determination for the driver can be made based on the presence/absence of the reaction (response) of the driver.

A feature of one embodiment of the present invention resides in that the control amount change means is configured to change the lane keeping assist control amount so that a travel position of the own vehicle is offset in a road width direction with respect to the target travel line when the set event is detected.

According to the one embodiment of the present invention, the control amount change means is configured to change the lane keeping assist control amount so that the travel position of the own vehicle is offset (shifted) in the road width direction with respect to the target travel line when the set event is detected. For example, the control amount change means changes a calculation equation for the lane keeping assist control amount so that the travel position of the own vehicle is offset in the road width direction with respect to the target travel line. As a result, the own vehicle decreases in the lane keeping assist performance, which is the performance of traveling along the original target travel line, and comes to travel along a travel line that is not desirable for the driver. Thus, the driver who has not lost the driving capability reacts in some way to the change in the travel state (change in the travel position) of the vehicle. As a result, the abnormality determination for the driver can be made based on the presence/absence of the reaction of the driver.

A feature of one embodiment of the present invention resides in that: the peripheral state information includes information representing a positional relationship between an own vehicle lane, which is a lane in which the own vehicle travels, and another vehicle lane, which is a lane neighboring the own vehicle lane; the change inhibition condition is set to a condition that the another vehicle lane is provided on each of the left and right sides of the own vehicle lane; and the control amount change means is configured to select a direction toward which the another vehicle lane is not provided, and change the lane keeping assist control amount so that the travel position of the own vehicle is offset toward the selected direction.

When the travel position of the own vehicle is offset in the road width direction with respect to the target travel line, the own vehicle does not abnormally approach another vehicle under a state where both the left and right neighborhoods of the lane in which the own vehicle is traveling are road shoulders. However, under a state where the lane in which the own vehicle is traveling neighbors another lane on at least one of the left and right sides, the own vehicle may abnormally approach another vehicle (another vehicle traveling on the another lane).

Thus, according to the one embodiment of the present invention, the control amount change inhibition means is configured to acquire, as the peripheral state information, the information representing the positional relationship between the own vehicle lane, which is the lane in which the own vehicle travels, and the another vehicle lane, which is the lane neighboring the own vehicle lane, and inhibit, when the another vehicle lane is provided on each of the left and right sides of the own vehicle lane, the control amount change means from changing the lane keeping assist control amount so that the travel position of the own vehicle is offset in the road width direction with respect to the target travel line.

Moreover, the control amount change means is configured to select, when the change inhibition condition is not satisfied, the direction toward which the another vehicle lane is not provided, and change the lane keeping assist control amount so that the travel position of the own vehicle is offset in the selected direction with respect to the target travel line. Thus, occurrence of such a trouble that the own vehicle abnormally approaches another vehicle due to the abnormality determination for the driver can be suppressed.

In the above description, in order to facilitate understanding of the invention, reference symbols used in embodiments of the present invention are enclosed in parentheses and are assigned to each of the constituent features of the invention corresponding to the embodiments. However, each of the constituent features of the invention is not limited to the embodiments defined by the reference symbols.

DETAILED DESCRIPTION OF THE PREFERRED EMBODIMENT

Referring to the accompanying drawings, a vehicle control device according to embodiments of the present invention is described below.

Figure 1:
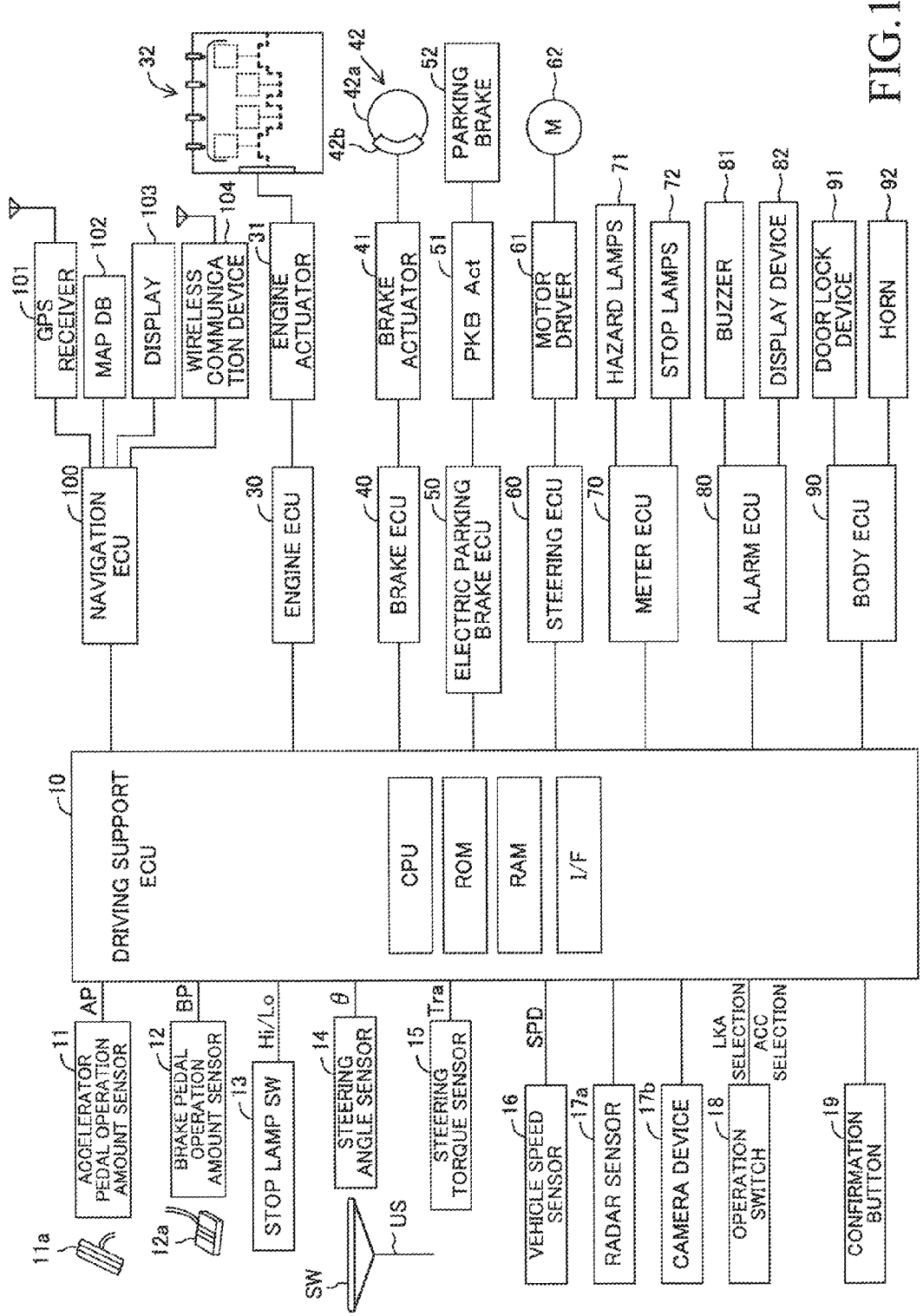
FIG. 1 is a schematic configuration diagram for illustrating a vehicle control device according to an embodiment of the present invention.

As illustrated in FIG. 1, the vehicle control device according to the embodiments of the present invention is applied to a vehicle (hereinafter also referred to as "own vehicle" in order to distinguish from other vehicles), and includes a driving support ECU 10, an engine ECU 30, a brake ECU 40, an electric parking brake ECU 50, a steering ECU 60, a meter ECU 70, an alarm ECU 80, a body ECU 90, and a navigation ECU 100.

Those ECUs are electric control units each including a microcomputer as a main part, and are connected to one another so as to be able to mutually transmit and receive information via a controller area network (CAN) (not shown). The microcomputer herein includes a CPU, a ROM, a RAM, a nonvolatile memory, an interface 1/F, and the like. The CPU executes instructions (programs and routines) stored in the ROM to realize various functions. Some or all of those ECUs may be integrated into one ECU.

The driving support ECU 10 is connected to sensors (including switches) listed below, and is configured to receive detection signals or output signals from those sensors. Alternatively, each sensor may be connected to an ECU other than the driving support ECU 10. In this case, the driving support ECU 10 receives the detection signal or the output signal of the sensor from the ECU to which the sensor is connected via the CAN.

An accelerator pedal operation amount sensor 11 is configured to detect an operation amount (accelerator opening degree) AP of an accelerator pedal 11a of the own vehicle, and output a signal representing the accelerator pedal operation amount AP.

A brake pedal operation amount sensor 12 is configured to detect an operation amount BP of a brake pedal 12a of the own vehicle, and output a signal representing the brake pedal operation amount BP.

A stop lamp switch 13 is configured to output a low level signal when the brake pedal 12a is not stepped on (not operated), and output a high level signal when the brake pedal 12a is stepped on (operated).

A steering angle sensor 14 is configured to detect a steering angle θ of the own vehicle, and output a signal representing the steering angle θ.

The steering torque sensor 15 is configured to detect a steering torque Tra applied to a steering shaft US of the own vehicle by the steering of a steering wheel SW, and output a signal representing the steering torque Tra.

A vehicle speed sensor 16 is configured to detect a travel speed SPD (vehicle speed) of the own vehicle, and output a signal representing the vehicle speed SPD.

A radar sensor 17a is configured to acquire information on a road ahead of the own vehicle, and three-dimensional (3D) objects existing on the road. The 3D object means a moving object, for example, a pedestrian, a bicycle, or a motor vehicle, or a fixed object, for example, an electric pole, a tree, or a guard rail. Those 3D objects are hereinafter also referred to as "objects".

The radar sensor 17a includes a "radar transmission/reception part and a signal processing part" (neither shown).

The radar transmission/reception part is configured to radiate a radio wave in a millimeter wave band (hereinafter referred to as "millimeter wave") to a peripheral region of the own vehicle including a region ahead of the own vehicle, and receives a millimeter wave (namely, a reflected wave) reflected by an object existing in the radiation range.

The signal processing part is configured to acquire an inter-vehicle distance (longitudinal distance), a relative speed, a lateral distance, a relative lateral speed, and the like for each of the detected objects at predetermined time periods based on a phase difference between the transmitted millimeter wave and the received reflected wave, an attenuation level of the reflected wave, a period from the transmission of the millimeter wave to the reception of the reflected wave, and the like.

In this embodiment, the radar sensor 17a is configured to radiate millimeter waves in a wide range from a forward direction to an obliquely backward direction of the own vehicle, and is thus able to detect an object existing in the forward direction, a side direction, and the obliquely backward direction of the own vehicle.

A camera device 17b includes a "stereo camera and an image processing part" (neither shown).

The stereo camera is configured to image scenes of both of a left side region and a right side region ahead of the own vehicle, thereby acquiring a pair of left and right pieces of image data.

The image processing part is configured to calculate and output presence/absence of objects, relative relationships between the own vehicle and objects, and the like based on the pair of left and right pieces of image data acquired by the stereo camera.

The driving support ECU 10 is configured to compose a relative relationship between the own vehicle and the object acquired by the radar sensor 17a and a relative relationship between the own vehicle and the object acquired by the camera device 17b with one another, thereby determining a relative relationship (object information) between the own vehicle and the object. Further, the driving support ECU 10 is configured to acquire lane markers (hereinafter simply referred to as "white lines"), for example, the left and right white lines of the road based on the pair of left and right pieces of image data (road image data) acquired by the camera device 17b, thereby acquiring a shape of the road (curvature radius representing a degree of the curve of the road), a positional relationship between the road and the own vehicle, and the like. In addition, the driving support ECU 10 can also acquire information on whether or not a road side wall exists based on the image data acquired by the camera device 17b.

An operation switch 18 is a switch operated by the driver. The driver operates the operation switch 18 to select whether or not to carry out lane keeping assist control (LKA). Further, the driver operates the operation switch 18 to select whether or not to carry out adaptive cruise control (ACC).

A confirmation button 19 is arranged at a position operable by the driver, and is configured to output a low level signal when the confirmation button 19 is not operated, and output a high level signal when the confirmation button 19 is pressed for operation.

The driving support ECU 10 is configured to be able to carry out the lane keeping assist control and the adaptive cruise control. Further, as described later, the driving support ECU 10 is configured to determine whether or not the driver is in an abnormal state where the driver has lost capability to drive the vehicle, and carry out various types of control for performing appropriate processing when the driver is determined to be in the abnormal state.

The engine ECU 30 is connected to an engine actuator 31. The engine actuator 31 is an actuator for changing an operation state of an internal combustion engine 32. In this example, the internal combustion engine 32 is a gasoline fuel injection, spark ignition, multi-cylinder engine, and includes a throttle valve for adjusting an intake air amount. The engine actuator 31 includes at least a throttle valve actuator for changing an opening degree of the throttle valve. The engine ECU 30 can drive the engine actuator 31, thereby changing a torque generated by the internal combustion engine 32. The torque generated by the internal combustion engine 32 is transmitted to drive wheels (not shown) via a transmission (not shown). Thus, the engine ECU 30 can control the engine actuator 31 to control a driving force of the own vehicle, thereby changing an acceleration state (acceleration).

The brake ECU 40 is connected to a brake actuator 41. The brake actuator 41 is provided in a hydraulic circuit between a master cylinder (not shown) configured to pressurize a working fluid with a stepping force on a brake pedal and friction brake mechanisms 42 provided on the front/rear left/right wheels. The friction brake mechanism 42 includes a brake disk 42a fixed to the wheel and a brake caliper 42b fixed to a vehicle body. The brake actuator 41 is configured to adjust a hydraulic pressure supplied to a wheel cylinder integrated into the brake caliper 42b in accordance with an instruction from the brake ECU 40 to use the hydraulic pressure to operate the wheel cylinder, thereby pressing a brake pad against the brake disk 42a and generating a friction braking force. Thus, the brake ECU 40 can control the brake actuator 41, thereby controlling the braking force of the own vehicle.

The electric parking brake ECU (hereinafter also referred to as "EPB ECU") 50 is connected to a parking brake actuator (hereinafter also referred to as "PKB actuator") 51. The PKB actuator 51 is an actuator for pressing the brake pad against the brake disk 42a, or is an actuator for pressing shoes against drums rotating together with the wheels when drum brakes are provided. Thus, the EPB ECU 50 can use the PKB actuator 51 to apply parking braking forces to the wheels, thereby maintaining the own vehicle in a stop state.

The steering ECU 60 is a control device for a known electric power steering system, and is connected to a motor driver 61. The motor driver 61 is connected to a steering motor 62. The steering motor 62 is integrated into a "steering mechanism including the steering wheel, a steering shaft coupled to the steering wheel, a steering gear mechanism, and the like" (not shown) of the vehicle. The steering motor 62 can use electric power supplied by the motor driver 61 to generate a torque, use this torque to apply a steering assist torque, and steer left and right steered wheels.

The meter ECU 70 is connected to a digital display-type meter (not shown) and is also connected to hazard lamps 71 and stop lamps 72. The meter ECU 70 can flash the hazard lamps 71 and turn on the stop lamps 72 in accordance with an instruction from the driving support ECU 10.

The alarm ECU 80 is connected to a buzzer 81 and a display device 82. The alarm ECU 80 is configured to be able to sound the buzzer 81 in accordance with an instruction from the driving support ECU 10, thereby attracting attention of the driver. The alarm ECU 80 can also turn on a mark (e.g., a warning lamp) for attracting attention on the display device 82, display a warning message, and display an operation state of the driving support control.

The body ECU 90 is connected to a door lock device 91 and a horn 92. The body ECU 90 is configured to be able to unlock the door lock device 91 in accordance with an instruction from the driving support ECU 10. Moreover, the body ECU 90 is configured to sound the horn 92 in accordance with an instruction from the driving support ECU 10.

The navigation ECU 100 is connected to a GPS receiver 101 configured to receive GPS signals for detecting a current position of the own vehicle, a map database 102 configured to store map information and the like, a touch-panel display 103, which is a human-machine interface, a wireless communication device 104 configured to receive road information transmitted from an external wireless transmission facility, and the like. The navigation ECU 100 and the above-mentioned configuration connected to the navigation ECU 100 may be hereinafter collectively referred to as "navigation device". The navigation ECU 100 is configured to identify the position of the own vehicle at the current time point based on the GPS signals, carry out various types of calculation processing based on the position of the own vehicle, the map information, and the like stored in the map database 102, and use the display 103 to carry out route guidance.

The map information stored in the map database 102 includes road information. The road information may include parameters indicating the shape (e.g., the curvature radius or the curvature of the road indicating a degree of how the road curves, the number of lanes, the width of the road, the lane width, and the like) of the road in each section of the road. The curvature is the reciprocal of the curvature radius.

The wireless communication device 104 is a communication device configured to receive road traffic information transmitted from a wireless transmission facility, which is an infrastructure facility installed on a road, and acquire, for example, traffic congestion information. Moreover, when the infrastructure facility is applied to a road/vehicle communication system for transmitting position information on a large number of vehicles existing in a periphery of an intersection, the wireless communication device 104 may acquire position information on other vehicles existing in a periphery of the own vehicle. The wireless communication device 104 is not limited to the infrastructure facility, and may be a communication device configured to receive position information on other vehicles transmitted from wireless communication devices installed on the other vehicles.

<Control Processing Carried Out by Driving Support ECU 10>

A description is now given of control processing to be carried out by the driving support ECU 10. The driving support ECU 10 is configured to carry out an abnormal-time driving support control routine (FIG. 4 or FIG. 5) described later when both the lane keeping assist control (LKA) and the adaptive cruise control (ACC) are being carried out. Thus, a description is first given of the lane keeping assist control and the adaptive cruise control.

<Lane Keeping Assist Control>

The lane keeping assist control (hereinafter referred to as "LKA") applies the steering torque to the steering mechanism so that the position of the own vehicle is maintained in a vicinity of the target travel line inside a "lane in which the own vehicle is traveling", thereby assisting the steering operation of the driver. The LKA itself is widely known (e.g., refer to Japanese Patent Application Laid-open No. 2008-195402, Japanese Patent Application Laid-open No. 2009-190464, Japanese Patent Application Laid-open No. 2010-6279, and Japanese Patent No. 4349210). Thus, a brief description is now given of the LKA.

Figure 2:
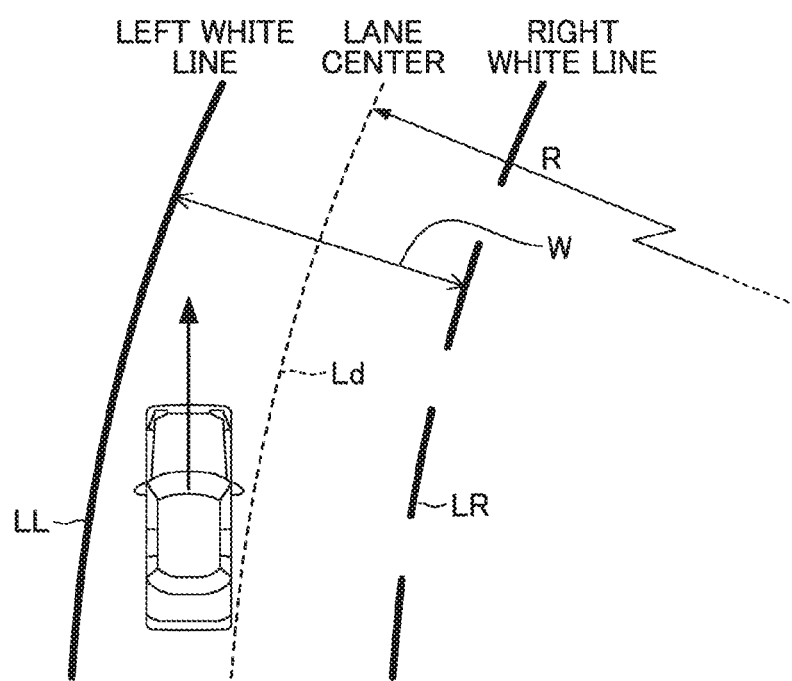
FIG. 2 is a plan view for illustrating a left white line, a right white line, a target travel line, and a curve radius.
Figure 3:
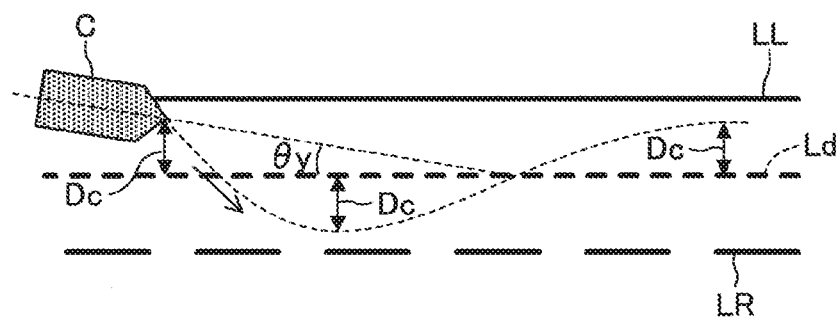
FIG. 3 is a diagram for illustrating lane keeping assist control.

The driving support ECU 10 is configured to carry out the LKA when the LKA is requested by the operation on the operation switch 18. More specifically, as illustrated in FIG. 2, when the LKA is requested, the driving support ECU 10 recognizes (acquires) the "left white line LL and the right white line LR" of the lane in which the own vehicle is traveling based on the image data transmitted from the camera device 17b, and determines a center position of those pair of white lines as a target travel line Ld. Further, the driving support ECU 10 is configured to calculate a curve radius (curvature radius) R of the target travel line Ld and a position and a direction of the own vehicle in the travel lane partitioned by the left white line LL and the right white line LR. Then, as illustrated in FIG. 3, the driving support ECU 10 calculates a distance Dc (hereinafter referred to as "center distance Dc") between a front end center position of the own vehicle C and the target travel line Ld in a road width direction, and a difference angle θy (hereinafter referred to as "yaw angle θy") between the direction of the target travel line Ld and the travel direction of the own vehicle C.

Further, the driving support ECU 10 calculates a target steering angle θLKA* at a predetermined calculation cycle based on the center distance Dc, the yaw angle θy, and the road curvature ν (=1/curvature radius R) in accordance with Expression (1). In Expression (1), K1, K2, and K3 are control gains. The target steering angle θLKA* is a steering angle set so that the own vehicle can travel along the target travel line Ld.

$$\theta LKA^* = K1 \times \nu + K2 \times \theta y + K3 \times Dc \quad (1)$$

The driving support ECU 10 is configured to output a command signal representing the target steering angle θLKA* to the steering ECU 60. The steering ECU 60 is configured to apply drive control to the steering motor 62 so that the steering angle follows the target steering angle θLKA*. In this case, the driving support ECU 10 calculates a target torque for achieving the target steering angle θLKA* at a predetermined calculation cycle based on the target steering angle θLKA* and an actual steering angle.

For example, the driving support ECU 10 stores a lookup table for prescribing a relationship between the target torque and the difference between the target steering angle θLKA* and the actual steering angle in advance, and calculates the target torque by referring to this table. The driving support ECU 10 then uses the steering ECU 60 to apply drive control to the steering motor 62 so as to generate the target torque on the steering motor 62. As the actual steering angle, the steering angle θ detected by the steering angle sensor 14, or a detection value of a sensor for directly detecting the steering angle of the steered wheel may be used.

A control amount used for the LKA is the target steering angle θLKA* in this example, but may be a target yaw rate or a target lateral acceleration of the own vehicle in place of the target steering angle θLKA*. In other words, the left side of Expression (1) may be the target yaw rate or the target lateral acceleration. In this case, for example, the driving support ECU 10 inputs a detection signal of a yaw rate sensor or a lateral acceleration sensor (not shown) and calculates a difference between the target yaw rate and an actual yaw rate (a detection value of the yaw rate sensor), or a difference between the target lateral acceleration and an actual lateral acceleration (a detection value of the lateral acceleration sensor). Then, the driving support ECU 10 refers to a lookup table for prescribing a relationship between such a difference and the target torque, thereby calculating the target torque.

The LKA assists the driving of the driver so that a travel position of the own vehicle moves along the target travel line Ld. Thus, even when the LKA is carried out, the hands-free driving is not permitted, and the driver needs to hold the steering wheel SW. The LKA has thus been summarized.

A function part of the driving support ECU 10 for carrying out the LKA corresponds to lane keeping assist means according to the present invention.

<Adaptive Cruise Control (ACC)>

The adaptive cruise control (hereinafter referred to as "ACC") is control of causing the own vehicle to follow a preceding vehicle traveling immediately ahead of the own vehicle while maintaining a distance between the own vehicle and the preceding vehicle to be a predetermined distance based on the object information. The ACC itself is widely known (e.g., refer to Japanese Patent Application Laid-open No. 2014-148293, Japanese Patent Application Laid-open No. 2006-315491, Japanese Patent No. 4172434, and Japanese Patent No. 4929777). Thus, a brief description is now given of the ACC.

The driving support ECU 10 is configured to carry out the ACC when the ACC is requested by the operation on the operation switch 18.

More specifically, the driving support ECU 10 is configured to select a following subject vehicle based on the object information acquired from the radar sensor 17a and the camera device 17b when the ACC is requested. For example, the driving support ECU 10 determines whether or not a relative position of the detected object (n) identified by a lateral distance Dfy(n) and an inter-vehicle distance Dfx(n) of the object (n) exists in a following subject vehicle area defined in advance so that the lateral distance decreases as the inter-vehicle distance increases. Then, the driving support ECU 10 selects the object (n) as the following subject vehicle when the relative position of the object exists in the following subject vehicle area for a period equal to or more than a predetermined period.

Further, the driving support ECU 10 calculates a target acceleration Gtgt in accordance with any one of Expression (2) and Expression (3). In Expression (2) and Expression (3), Vfx(a) is a relative speed of a following subject vehicle (a), k1 and k2 are predetermined positive gains (coefficients), and ΔD1 is an inter-vehicle distance difference (=Dfx(a)−Dtgt) acquired by subtracting the "target inter-vehicle distance Dtgt from an inter-vehicle distance Dfx(a) of the following subject vehicle (a)". The target inter-vehicle distance Dtgt is calculated by multiplying a target inter-vehicle period Ttgt set by the driver using the operation switch 18 by the vehicle speed SPD of the own vehicle (that is, Dtgt=Ttgt·SPD).

The driving support ECU 10 uses Expression (2) to determine the target acceleration Gtgt when the value (k1·ΔD1+k2·Vfx(a)) is positive or "0". ka1 is a positive gain (coefficient) for acceleration, and is set to a value equal to or less than "1".

The driving support ECU 10 uses Expression (3) to determine the target acceleration Gtgt when the value (k1·ΔD1+k2·Vfx(a)) is negative. kd1 is a gain (coefficient) for deceleration, and is set to "1" in this example.

$$Gtgt \text{ (for acceleration)} = ka1 \cdot (k1 \cdot \Delta D1 + k2 \cdot Vfx(a)) \quad (2)$$

$$Gtgt \text{ (for deceleration)} = kd1 \cdot (k1 \cdot \Delta D1 + k2 Vfx(a)) \quad (3)$$

When an object does not exist in the following subject vehicle area, the driving support ECU 10 determines the target acceleration Gtgt based on a "target speed set in accordance with the target inter-vehicle distance Ttgt" and the vehicle speed SPD of the own vehicle so that the vehicle speed SPD matches the target speed.

The driving support ECU 10 uses the engine ECU 30 to control the engine actuator 31, and, depending on necessity, uses the brake ECU 40 to control the brake actuator 41 so that the acceleration of the own vehicle matches the target acceleration Gtgt. The ACC has thus been summarized.

While the ACC is being carried out in this way, the own vehicle can be caused to travel without necessity of an accelerator operation and a brake operation of the driver.

<Abnormal-Time Driving Support Control Routine>

Figure 4:
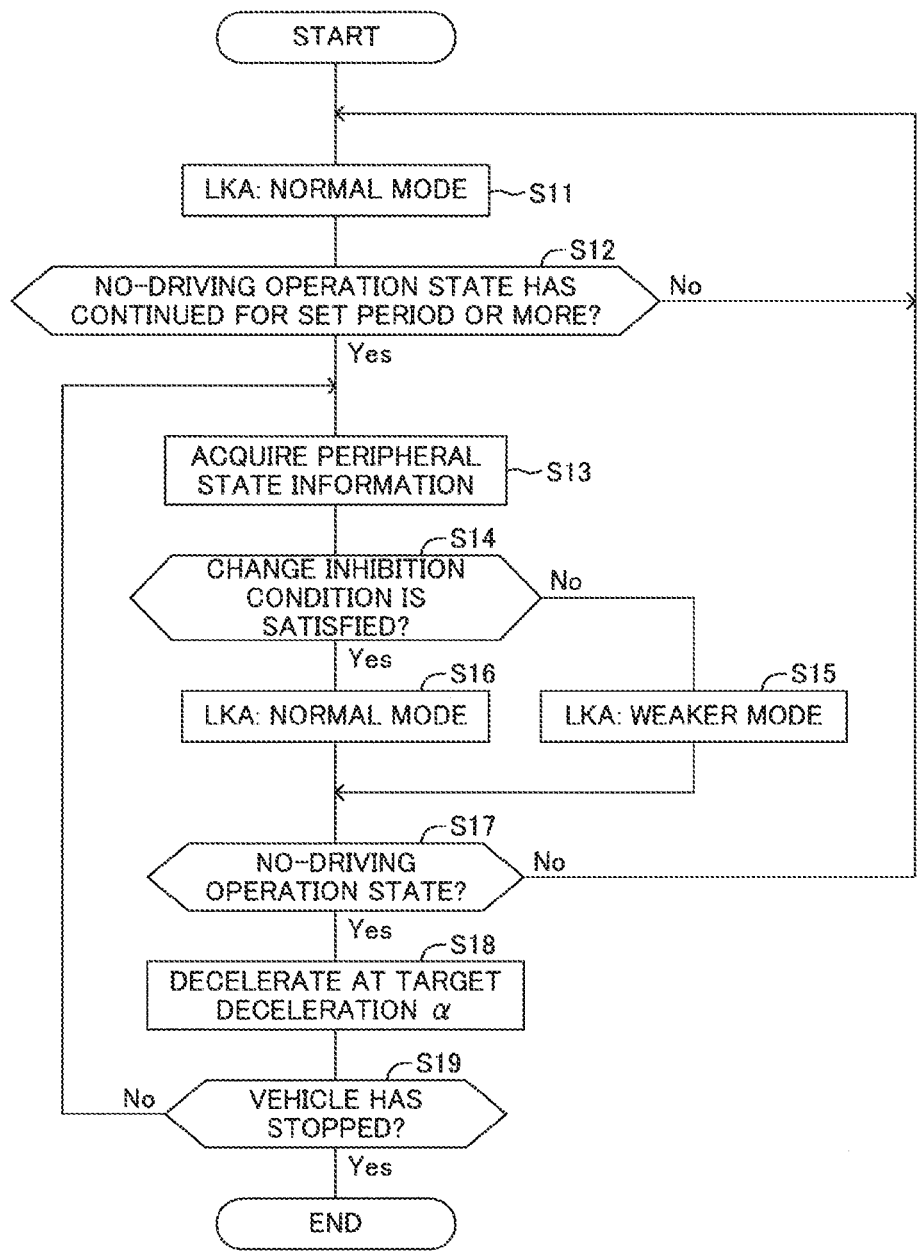
FIG. 4 is a flowchart for illustrating an abnormal-time driving support control routine according to a first embodiment of the present invention.
Figure 5:
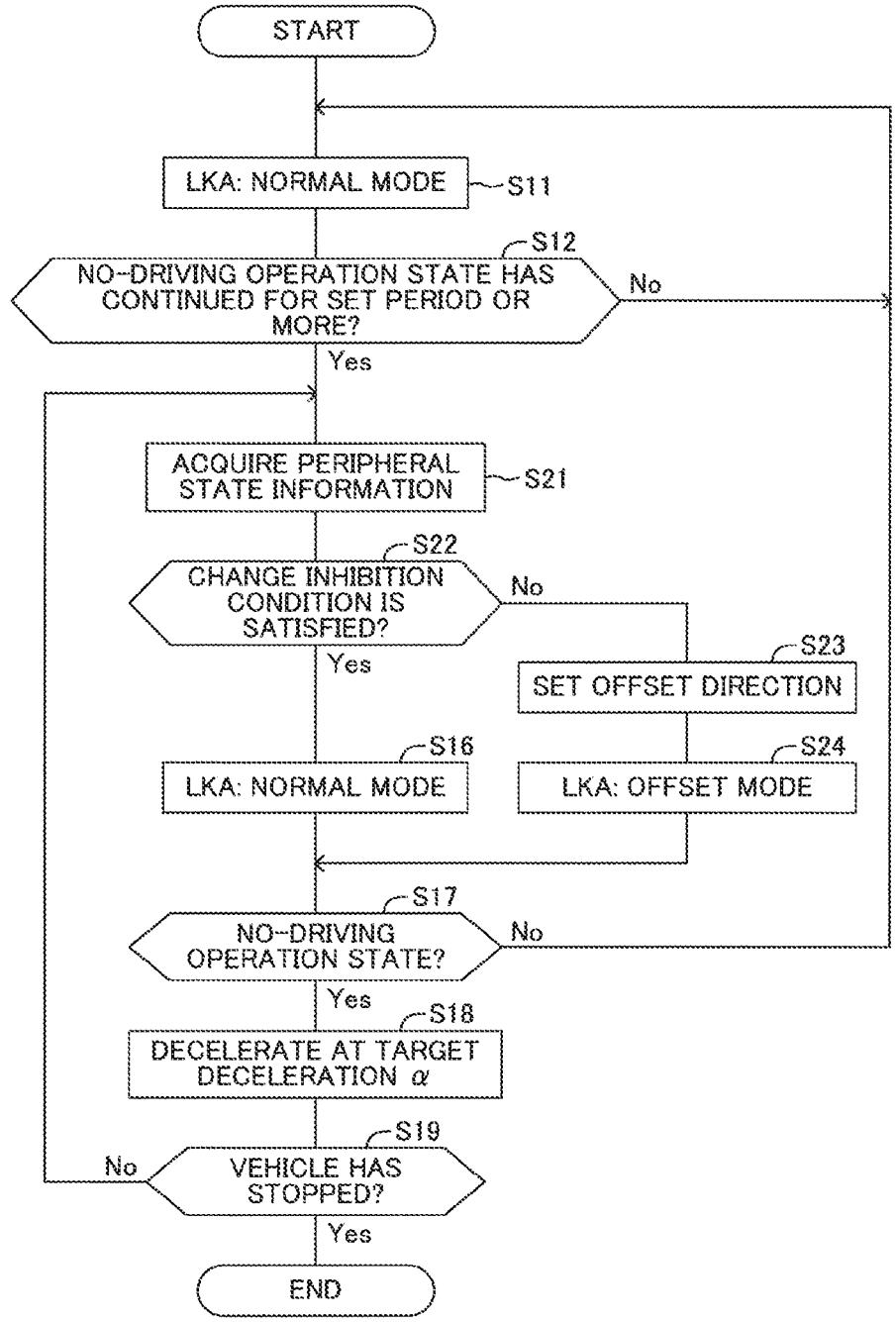
FIG. 5 is a flowchart for illustrating the abnormal-time driving support control routine according to a second embodiment of the present invention.

A description is now given of abnormal-time driving support control processing to be carried out by the driving support ECU 10. FIG. 4 is a flowchart for illustrating an abnormal-time driving support control routine to be executed by the driving support ECU 10. When the driving support ECU 10 is carrying out both the LKA and the ACC, the driving support ECU 10 executes the abnormal-time driving support control routine in parallel with both the LKA and the ACC.

When the abnormal-time driving support control routine starts, in Step S11, the driving support ECU 10 sets a control mode of the LKA to a "normal mode". The control mode of the LKA is divided into the "normal mode" and a "weaker mode", and one of the modes is selected to be carried out. The "normal mode" is a mode where the steering angle is controlled so that the own vehicle can appropriately travel along the target travel line, and the control amount is set in accordance with Expression (1). On the other hand, the "weaker mode" is a mode where the control amount of the LKA is decreased compared with the "normal mode" to decrease the steering torque generated by the steering motor 62, and performance of the own vehicle in traveling along the target travel line decreases. The LKA is set to the "normal mode" as long as the "weaker mode" is not set. Those two control modes for the LKA are not selected in accordance with preference of the driver, and are set by this abnormal-time driving support control routine.

The driving support ECU 10 is configured to carry out the LKA in parallel with the abnormal-time driving support control routine. Thus, in Step S11, processing is carried out in which the control mode of the LKA carried out in parallel with the abnormal-time driving support control routine is set to the "normal mode". Thus, the steering operation of the driver is supported so that the own vehicle travels along the target travel line.

Then, in Step S12, the driving support ECU 10 determines whether or not a state where the driver does not carry out the operation of driving the vehicle (no-driving operation state) has continued for a period equal to or more than a set period. This no-driving operation state is a state where none of parameters out of a combination of at least one of the "accelerator pedal operation amount AP, the brake pedal operation amount BP, the steering torque Tra, and a signal level of the stop lamp switch 13" changes by the operation of the driver (input to a driving operator). In this embodiment, the driving support ECU 10 is configured to consider a state where none of the "accelerator pedal operation amount AP, the brake pedal operation amount BP, and the steering torque Tra" changes, and the steering torque Tra remains "0" as the no-driving operation state.

Measurement of the continuation period of the no-driving operation state may be reading the above-mentioned operation amounts (AP, BP, and Tra) at a predetermined calculation cycle, incrementing a timer value each time the state is determined to be the no-driving operation state, and clearing the timer value to zero each time the state is determined not to be the no-driving operation state. In this case, when the timer value reaches the set value, the determination in Step S12 becomes "Yes".

The driving support ECU 10 returns the processing to Step S11 until the continuation period of the no-driving operation state does not reach the set period, and maintains the control mode of the LKA in the normal mode. The driving support ECU 10 repeats this processing, and, when the continuation period of the no-driving operation state reaches the set period (Yes in Step S12), advances the processing to Step S13.

When the continuation period of the no-driving operation state reaches the set period, the driver is suspected to have fallen into the abnormal state (state where the driver has lost the capability to drive the vehicle). On the other hand, when the LKA and the ACC are being carried out, the own vehicle travels along the target travel line even when the driver is not carrying out the driving operation. When the LKA according to this embodiment is being carried out, the driver is required to hold the steering wheel SW, but the driver may be too negligent to hold the steering wheel SW.

Therefore, while the LKA is being carried out, when the control mode is changed to the "weaker mode" so that a travel position of the own vehicle is likely to deviate from the target travel line desirable for the driver, the driver who has not fallen into the abnormal state is considered to react in some way to the change (the deviation of the travel position of the own vehicle from the target travel line) in the travel state. Thus, the state where the driver has fallen into the abnormal state and the state where the driver has not fallen into the abnormal state can be discriminated from one another by detecting the presence/absence of the reaction of the driver.

However, when the control mode of the LKA is set to the "weaker mode", the own vehicle travels so as to swerve in the lateral direction in the lane, which may not be preferred in terms of safety depending on a peripheral state (road state and other peripheral vehicle state) of the travel of the own vehicle. For example, troubles, for example, the own vehicle deviating outside of the lane, an abnormal approach of the own vehicle to another vehicle, and the like may be caused. Thus, the driving support ECU 10 carries out processing starting from Step S13 described below.

In Step S13, the driving support ECU 10 acquires the peripheral state information on the own vehicle. In this embodiment, this peripheral state information is information on a curvature radius R of the lane in which the own vehicle travels, a lane width W (refer to FIG. 2) of the lane in which the own vehicle travels, and other vehicles in the periphery of the own vehicle.

The driving support ECU 10 is configured to acquire the curvature radius R calculated in the course of the calculation of the control amount of the LKA as one of pieces of the peripheral state information. Moreover, the driving support ECU 10 is configured to calculate the distance between the left white line LL and the right white line LR based on position information on the left and right white lines LL and LR detected for calculating the control amount of the LKA, and acquire the lane width W, which is a result of this calculation, as one of the pieces of the peripheral state information. In this case, the left and right white lines LL and LR respectively have widths (thicknesses of the lines), and the lane width W may be a distance between inner ends thereof, a distance between outer ends thereof, or a distance between center positions thereof.

When the map DB 102 of the navigation ECU 100 stores the curvature radius R and the lane width W of the lane in which the own vehicle is traveling, the stored information may be used as the peripheral state information. Moreover, information relating to the curvature radius R and the lane width W of the lane in which the own vehicle is traveling may be successively acquired by using an external service system, for example, a traffic information center.

The driving support ECU 10 is configured to acquire position information on the another vehicle detected by the radar sensor 17*a* relative to the own vehicle as information on the another vehicle in the periphery of the own vehicle. This information may be position information on the another vehicle relative to the own vehicle acquired by using the camera device 17*b* in place of the radar sensor 17*a* to image the periphery of the own vehicle, and detecting the another vehicle from the taken image. In this case, the camera device 17*b* is preferably configured to be able to image in a wide range at least from a forward direction to an obliquely backward direction of the own vehicle.

Then, in Step S14, the driving support ECU 10 determines whether or not a change inhibition condition set in advance is satisfied or not based on the acquired peripheral state information. The change inhibition condition is a condition of inhibiting the change in the control mode of the LKA from the "normal mode" to the "weaker mode".

The change inhibition conditions are set in advance as follows.

Condition 1: the curvature radius R is less than an inhibition threshold radius Rref.

Condition 2: the lane width W is less than an inhibition threshold width Wref.

Condition 3: another vehicle is predicted to exist to a side of the own vehicle.

The condition 1 is set, for example, for a case where the curvature radius R continues to be less than the inhibition threshold radius Rref for a certain distance range in the lane forward of the own vehicle. The condition 2 is set, for example, for a case where the lane width W continues to be less than the inhibition threshold width Wref for a certain distance range in the lane forward of the own vehicle.

Moreover, the third condition is set, for example, for a case where other vehicles exist in the immediately side direction of the own vehicle, and in a range between forward and backward positions at the set distance from a position in the immediately side direction in the left and right lanes neighboring the lane in which the own vehicle travels.

In this embodiment, when even one out of those three conditions is satisfied, in Step S14, the change inhibition condition is satisfied (Yes in Step S14).

In this embodiment, the change inhibition conditions are the above-mentioned three conditions, but all the three conditions do not always need to be employed, and, for example, an arbitrary condition out of the three conditions may be employed. In other words, the change inhibition conditions may include only the condition 1, only the condition 2, or only the condition 3. Moreover, as the change inhibition conditions, two arbitrary conditions out of the above-mentioned three conditions may be employed. For example, the change inhibition conditions may be a condition that at least one of the condition 1 and the condition 2 is satisfied, a condition that at least one of the condition 1 and the condition 3 is satisfied, or a condition that at least one of the conditions 2 and the condition 3 is satisfied.

When the change inhibition condition is not satisfied (No in Step S14), in Step S15, the driving support ECU 10 sets the control mode of the LKA to the weaker mode.

When the driving support ECU 10 sets the control mode of the LKA to the "weaker mode", the driving support ECU 10 decreases the control amount ($\theta LKA^*$) of the LKA more than that of in the "normal mode". In this embodiment, the driving support ECU 10 is configured to set the control gain K2 and the control gain K3 in Expression (1) to values less than those used in the normal mode. In other words, the control gain K2 of the yaw angle proportional term proportional to the magnitude of the yaw angle $\theta y$ and the control gain K3 of the center distance proportional term proportional to the magnitude of the center distance Dc are changed to small values compared with the values used in the normal mode.

For example, when the values in the "normal mode" of the control gain K2 and the control gain K3 are denoted by a normal control gain K2a and a normal control gain K3a, and the values in the "weaker mode" thereof are denoted by a weaker control gain K2b and a weaker control gain K3b, the weaker control gains K2b and K3b are represented, for example, as follows.

$K2b=0.1 \times K2a$ $K3b=0.1 \times K3a$

In this example, the weaker control gains K2b and K3b are set to values of 1/10 of the normal control gains K2a and K3a, respectively, but the degrees of weakness may be arbitrarily set.

Thus, when the control mode of the LKA is set to the "weaker mode", the own vehicle is unlikely to travel along the target travel line Ld compared with the "normal mode", and tends to swerve in a lateral direction (road widthwise direction). In this case, the control gain K1, which is a curvature proportional term proportional to the magnitude of the road curvature v (=1/curvature radius R) is not changed. This is because when the control gain K1 is decreased, the own vehicle may deviate outside (outside of the left or right white line) of the lane when the own vehicle travels on a curved road even when the curvature radius R is equal to or more than the inhibition threshold radius Rref. Thus, the own vehicle can be caused to appropriately swerve within the lane without deviating outside of the lane by decreasing only the control gain K2 and the control gain K3.

When the control mode is set to the "weaker mode", the control amount ($\theta LKA^*$) of the LKA does not always need to be calculated as described above, and, for example, the control amount in the "normal mode" may be multiplied by a decrease coefficient so as to decrease the entire control amount. Moreover, the target torque calculated from the target steering angle $\theta LKA^*$ may be multiplied by a decrease coefficient.

When the travel state of the own vehicle changes in this way, the own vehicle does not travel on the travel line desired for the driver. Therefore, a driver who has not lost the driving capability is prompted to carry out the steering wheel operation. As a result, the driver, who has neglected the steering wheel operation, starts the steering wheel operation, and no longer puts too much confidence in the LKA. Moreover, for example, a dosing driver may be awakened by swerving the own vehicle.

Thus, a driver who has not lost the driving capability reacts in some way to the change in the travel state of the own vehicle, for example, by performing the steering wheel operation. For example, an intentional driving operation such as a brake pedal operation or an accelerator pedal operation of the driver may be started. Alternatively, an intentional change in posture of the driver and the like may occur. Thus, it is possible to discriminate the abnormal state where the driver has lost the capability to drive the vehicle and the state where the driver is neglecting the steering wheel operation even when the driver is capable of driving the vehicle from each other based on the presence/absence of the reaction of the driver.

The driving support ECU 10 sets the control mode of the LKA to the "weaker mode", and then, in Step S17, determines whether or not the driver is in the no-driving operation state in which the driver does not carry out operations for driving the vehicle. When the driver carries out some driving operation as a reaction (response) caused by the change in the travel state of the own vehicle, a determination of "No" is made. In this case, the driving support ECU 10 determines that the driver is not in the abnormal state, that is, is in the normal state where the driver has the capability to drive the vehicle, and returns the processing to Step S11. In this way, the control mode of the LKA is returned from the "weaker mode" to the "normal mode".

On the other hand, when the no-driving operation state continues (Yes in Step S17), the driving support ECU 10 advances processing to Step S18 to stop the ACC and decelerate the own vehicle at a constant target deceleration a set in advance. In this case, the driving support ECU 10 acquires an acceleration of the own vehicle from a change amount per unit time of the vehicle speed SPD acquired based on the signal from the vehicle speed sensor 16, and outputs a command signal for causing the acceleration to match the target acceleration a to the engine ECU 30 and the brake ECU 40. As a result, the own vehicle can be decelerated at the constant target deceleration a.

When this processing is repeated, and the driving operation is detected in the course (No in Step S17), the driving support ECU 10 returns the processing to Step S11.

Moreover, when the change inhibition condition is satisfied (Yes in Step S14), in Step S16, the driving support ECU 10 sets the control mode of the LKA to the "normal mode". When the control mode of the LKA is the "normal mode" immediately before the processing in Step S16 is carried out, the "normal mode" continues. In this case, the driving support ECU 10 calculates the control amount of the LKA in accordance with Expression (1). As a result, the steering angle is controlled so that the own vehicle can appropriately travel along the target travel line.

For example, when the lane (travel lane) in which the own vehicle travels is a sharp curve, and the control mode of the LKA is set to the "weaker mode" to cause the own vehicle to swerve in the lateral direction, the own vehicle may deviate outside (the outside of the left or right white line) of the lane. Thus, the condition 1 is set as the change inhibition condition. This condition 1 sets such a lower limit value (=inhibition threshold radius Rref) of the curvature radius R of the lane in which the own vehicle travels that the own vehicle is predicted not to deviate from the lane. Thus, when the condition 1 is satisfied as the change inhibition condition, the control mode of the LKA is set to the "normal mode", thereby enabling suppression of the occurrence of such a trouble that the own vehicle deviates from the lane.

For example, when the lane width W of the lane in which the own vehicle travels is narrow, and the control mode of the LKA is set to the "weaker mode" to cause the own vehicle to swerve in the lateral direction, the own vehicle may deviate outside of the lane. Thus, the condition 2 is set as the change inhibition condition. This condition 2 sets such a lower limit value (=inhibition threshold width Wref) of the lane width W of the lane in which the own vehicle travels that the own vehicle is predicted not to deviate from the lane even when the control mode of the LKA is set to the "weaker mode". Thus, when the condition 2 is satisfied as the change inhibition condition, the control mode of the LKA is set to the "normal mode", thereby enabling suppression of the occurrence of such a trouble that the own vehicle deviates from the lane.

Figure 6A:
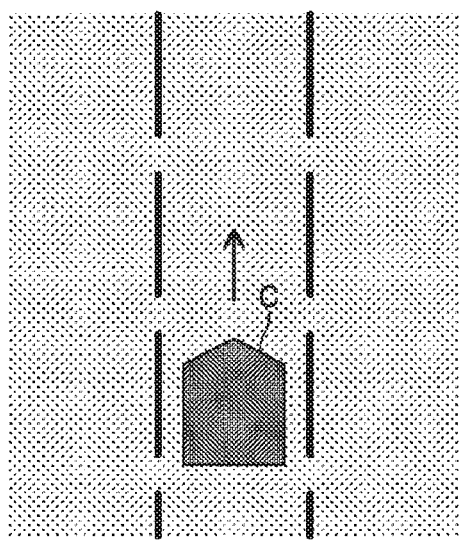
FIG. 6A is a diagram for illustrating a condition 3 of change inhibition conditions.
Figure 6B:
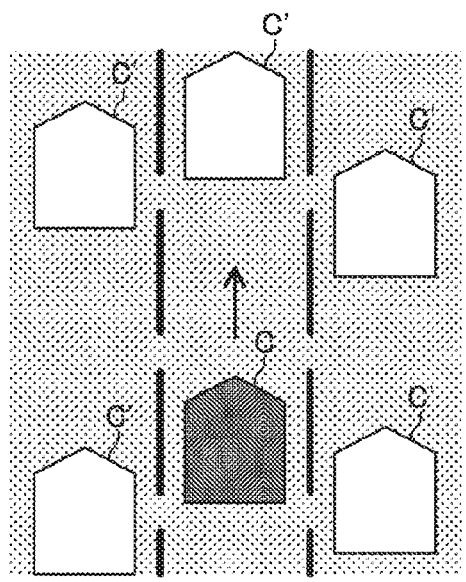
FIG. 6B is a diagram for illustrating a condition 3 of change inhibition conditions.

For example, when another vehicle exists to the side of the own vehicle, and the control mode of the LKA is set to the "weaker mode" to cause the own vehicle to swerve in the lateral direction, the own vehicle may abnormally approach the another vehicle. Thus, the condition 3 is set as the change inhibition condition. This condition 3 sets such a position (range) of another vehicle in the periphery of the own vehicle that the own vehicle may abnormally approach the another vehicle when the control mode of the LKA is set to the "weaker mode". Thus, when the condition 3 is satisfied as the change inhibition condition, the control mode of the LKA is set to the "normal mode", thereby enabling suppression of the occurrence of such a trouble that the own vehicle abnormally approaches the another vehicle. For example, as illustrated in FIG. 6A, when another vehicle does not exist in the immediately side direction of the own vehicle C, and in the range between the forward and backward positions at the set distance from the position in the immediately side direction, the control mode of the LKA is set to the "weaker mode". On the other hand, as illustrated in FIG. 6B, when at least one other vehicle C' exists in the immediately side direction of the own vehicle C, or in the range between the forward and backward positions at the set distance from the position in the immediately side direction, the control mode of the LKA is set to the "normal mode".

In Step S18, the driving support ECU 10 starts the deceleration control of decelerating the own vehicle at the target deceleration a, and, in Step S19, determines whether or not the own vehicle has stopped based on the vehicle speed SPD. When the own vehicle has not stopped, the driving support ECU 10 returns the processing to Step S13, and repeats the above-mentioned processing. Thus, the newest peripheral state information is acquired, whether or not the change inhibition conditions are satisfied is determined based on this peripheral state information, and the control mode of the LKA is set based on the determination result.

The driving support ECU 10 repeats this processing, determines that the driver has not fallen into the abnormal state when the driving operation is detected in the course, and returns the processing to Step S11. On the other hand, when the own vehicle stops as a result of the deceleration control while the driving operation is not detected (Yes in Step S19), the driving support ECU 10 finishes this routine.

With the above-mentioned vehicle control device according to this embodiment, when the no-driving operation state continues for a period equal to or more than the set period, the control mode of the LKA is set to the "weaker mode". As a result, the own vehicle travels in the lane so as to swerve in the lateral direction. Thus, even when the driving support control is being carried out, the abnormality determination for the driver can be made based on the presence/absence of the reaction of the driver.

Simultaneously, when the change inhibition condition set in advance in relation to the peripheral state of the own vehicle is determined to be satisfied based on the peripheral state information on the own vehicle, the control mode of the LKA is inhibited from being set to the "weaker mode". Thus, the occurrence of such a trouble that the own vehicle deviates from the lane and such a trouble that the own vehicle abnormally approaches another vehicle can be suppressed when the abnormality determination for the driver is made. As a result, according to this embodiment, the abnormality determination for the driver can be appropriately made in accordance with the peripheral state.

Moreover, when the driving operation of the driver is detected after the control mode of the LKA is set to the "weaker mode", the control mode of the LKA is returned to the "normal mode", and thus the driver can again receive the original driving support by the LKA.

The determination processing in Step S12 is processing of determining whether or not the "set event set in advance where the driver is suspected to be in the abnormal state" is detected. In this embodiment, in this processing, the set event is the continuation of the state (no-driving operation state) where the driving operation of the driver is not detected for a period equal to or more than the set period, but the set event does not always need to be such a state.

For example, so-called "driver monitoring technology" disclosed in Japanese Patent Application Laid-open No. 2013-152700 and the like may be employed. More specifically, a camera for imaging the driver is installed on a member (e.g., a steering wheel or a pillar) in a vehicle cabin, and the driving support ECU 10 uses the acquired image of the camera to monitor the direction of the line of sight or the direction of the face of the driver. The driving support ECU 10 determines that the set event where the driver is suspected to be in the abnormal state is detected when the line of sight or the face of the driver is kept facing for a predetermined period or more toward a direction in which the line of sight or the face of the driver is not usually directed for a long period during the normal driving of the vehicle.

Further, as another set event, the confirmation button 19 may be used. More specifically, the driving support ECU 10 uses a display and/or a sound to prompt the operation of the confirmation button 19 each time a set confirmation period T1 elapses, and determines that the set event where the driver is suspected to be in an abnormal state is detected when the state where the confirmation button 19 is not operated continues for a period equal to or more than a set no-response period T2, which is more than the set confirmation period T1.

Moreover, the determination processing in Step S17 corresponds to reaction detection means according to the present invention. For this determination processing, the above-mentioned "driver monitoring technology" may be used. In other words, a change in the direction of the line of sight or the direction of the face of the driver toward an appropriate direction set in advance may be considered as the reaction of the driver.

Moreover, in this embodiment, another vehicle in the periphery of the own vehicle is detected by the radar sensor 17a or the camera device 17b, thereby determining whether or not the condition 3 out of the change inhibition conditions is satisfied, but another vehicle does not always need to be directly detected. For example, the driving support ECU 10 may be configured to acquire traffic congestion information transmitted from a wireless transmission antenna, which is an infrastructure facility installed on a road, via the navigation device. In this case, another vehicle is likely to exist to the side of the own vehicle in a state where such information that traffic congestion occurs in an area in which the own vehicle is traveling is acquired, and hence the driving support ECU 10 determines that the condition 3 out of the change inhibition conditions is satisfied. Moreover, the driving support ECU 10 may be configured to receive position information on another vehicle (position information on the another vehicle detected by a GPS receiver of the another vehicle) transmitted from a wireless communication device (vehicle-to-vehicle communication device) installed on the another vehicle via the navigation device, recognize the position of the another vehicle in the periphery of the own vehicle, and determine whether or not the condition 3 is satisfied.

Second Embodiment

A description is now given of a vehicle control device according to a second embodiment of the present invention. The vehicle control device according to the second embodiment is different from the above-mentioned embodiment only in that the driving support ECU 10 is configured to carry out an abnormal-time driving support control routine illustrated in FIG. 5 in place of the abnormal-time driving support control routine described above (FIG. 4). In the following, the above-mentioned embodiment is referred to as a first embodiment of the present invention.

In the first embodiment, the control mode of the LKA is set to the "weaker mode" for making the abnormality determination for the driver. On the other hand, the second embodiment is different from the first embodiment in that the control mode of the LKA is set to an "offset mode" of offsetting the travel position of the own vehicle in the road width direction with respect to the target travel line Ld, and that four change inhibition conditions are set.

Figure 7A:
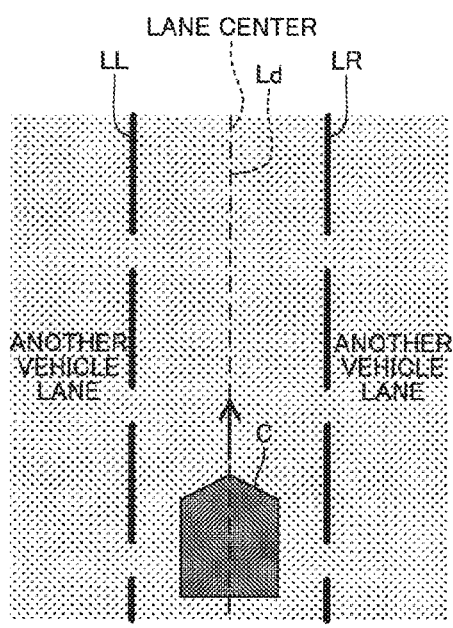
FIG. 7A is a diagram for illustrating a direction in which an offset line Ld' is set.
Figure 7B:
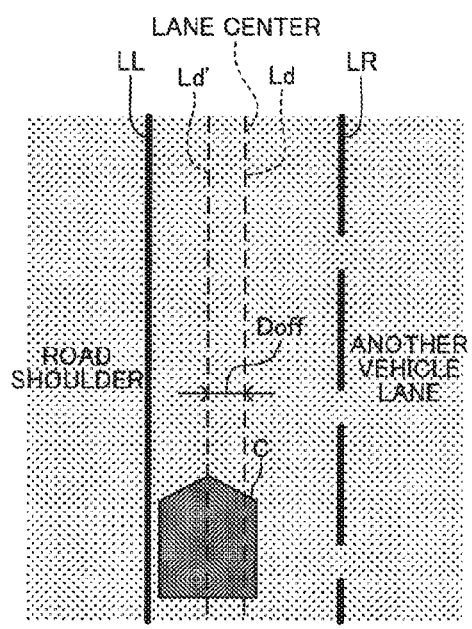
FIG. 7B is a diagram for illustrating a direction in which an offset line Ld' is set.

A description is now given of the "offset mode". In the "normal mode", as illustrated in FIG. 7A, steering control is applied to the own vehicle C so that the own vehicle travels along the target travel line Ld, which is the center of the lane. On the other hand, in "the offset mode", as illustrated in FIG. 7B, steering control is applied so that the own vehicle C travels along a line Ld' that is offset (shifted) in the road width direction by a predetermined distance (offset amount Doff) with respect to the target travel line Ld. This line Ld' is referred to as "offset line Ld'". When the control mode of the LKA is set to the "offset mode", the driving support ECU 10 calculates the target steering angle θLKA* so that the own vehicle C can travel along the offset line Ld'.

When the LKA is carried out while the LKA is set to the "offset mode" in this way, the lane keeping assist performance, which is the performance of traveling along the original target travel line Ld, decreases, and the own vehicle comes to travel at the position undesirable for the driver. Thus, the driver who has not lost the driving capability reacts in some way to the change in the travel state (change in the travel position) of the own vehicle. In the second embodiment, the abnormality determination for the driver is made based on presence/absence of a reaction (response) of the driver when the control mode of the LKA is set to the "offset mode".

When the travel position of the own vehicle is offset in the road width direction with respect to the target travel line Ld, the own vehicle does not abnormally approach another vehicle under a state where both the left and right neighborhoods of the lane in which the own vehicle is traveling are road shoulders. However, under a state where the lane in which the own vehicle is traveling neighbors another lane on at least one of the left and right sides, when the offset line Ld' is set toward the neighboring lane with respect to the lane center position, the own vehicle may abnormally approach another vehicle.

Thus, in the second embodiment, the change inhibition conditions are set to the following condition 4 in addition to the above-mentioned conditions 1, 2, and 3.

Condition 4: another lane is provided in each of both left and right neighborhoods of the lane in which the own vehicle is traveling.

Moreover, when another lane (referred to as "another vehicle lane") is provided on any one of the left and right sides of the lane (referred to as "own vehicle lane") in which the own vehicle is traveling, a direction in which the another vehicle lane is not provided, that is, a direction in which a road shoulder is provided is selected, and the offset line Ld' offset in the selected direction is set with respect to the target travel line Ld.

A description is now given of the abnormal-time driving support control routine (FIG. 5) according to the second embodiment. The same processing as that of the first embodiment is denoted by common step numbers in the flowchart, and a description thereof is omitted or is briefly given. The condition under which the abnormal-time driving support control routine according to the second embodiment is executed is the same as that of the first embodiment.

In Step S12, when the driving support ECU 10 determines that the no-driving operation state has continued for a period equal to or more than the set period, the driving support ECU 10 advances the processing to Step S21. In Step S21, the driving support ECU 10 acquires the peripheral state information on the own vehicle. In this case, the driving support ECU 10 acquires lane information representing a relationship between the own vehicle lane and another vehicle lane neighboring the own vehicle lane in addition to the peripheral state information acquired in the first embodiment. The lane information is information representing a positional relationship between the own vehicle lane and the another vehicle lane. In this case, the lane information only needs to be information that enables determination of whether or not another vehicle lane exists to the left side of the own vehicle lane and whether or not another vehicle lane exists to the right side of the own vehicle lane.

As the lane information, for example, type information (shape information) on the left and right white lines LL and LR formed on both sides of the own vehicle lane may be used. For example, as illustrated in FIG. 7A, when both the left and right white lines LL and LR have broken line shapes, another vehicle lane is predicted to exist on each of the left and right sides of the own vehicle lane. Moreover, for example, as illustrated in FIG. 7B, when the left white line LL has a solid line shape, and the right white line LR has the broken line shape, another vehicle lane is predicted not to exist (road shoulder exists) on the left side of the own vehicle lane, and another vehicle lane is predicted to exist on the right side of the own vehicle lane. The type information (shape information) on the white line can be acquired from the image taken by the camera device 17b.

A white line having the solid line shape is used for a border between the lane and the road shoulder. A white line having the broken line shape is used for a border between the lanes. Therefore, it is possible to discriminate a state where another vehicle lane is formed and a state where a road shoulder is formed in each of the left neighborhood and the right neighborhood of the own vehicle lane from one another based on the shape of the white line formed on each of the left and right sides of the own vehicle lane.

The lane information can be acquired without using the type information on the white line. For example, when the navigation device can be used to recognize the lane position (the position of the own vehicle lane discriminated based on the own vehicle position identified by GPS signals) in the road in which the own vehicle is traveling, this lane position information may be used. Moreover, the lane position in which the own vehicle is traveling can be predicted from the information acquired from the navigation device and the positions of other vehicles in the periphery of the own vehicle detected by the radar sensor 17a. For example, when the number of lanes of the road in which the own vehicle is traveling is recognized to be two from the navigation device, and another vehicle traveling on the right side of the own vehicle is detected, it is possible to predict that another vehicle lane exists in the right neighborhood of the own vehicle, but does not exist (road shoulder is formed) in the left neighborhood of the own vehicle.

The driving support ECU 10 acquires the peripheral state information, and then, in Step S22, determines whether or not the change inhibition condition set in advance is satisfied based on the acquired peripheral state information. The change inhibition condition is the condition of inhibiting the change in the control mode of the LKA from the "normal mode" to the "offset mode". In the second embodiment, as the change inhibition conditions, in addition to the conditions 1, 2, and 3 described in the first embodiment, the condition 4 (another lane is provided in each of both the left and right neighborhoods of the lane in which the own vehicle is traveling) is set. When even one out of those four conditions is satisfied, in Step S22, the change inhibition condition is determined to be satisfied (Yes in Step S22).

For example, regarding the condition 4, as illustrated in FIG. 7A, the change inhibition condition is satisfied when another vehicle lane is formed on each of the left and right sides of the own vehicle lane.

When the change inhibition condition is satisfied, in Step S16, the driving support ECU 10 sets the control mode of the LKA to the "normal mode".

On the other hand, when the change inhibition condition is not satisfied, in Step S23, the driving support ECU 10 sets the direction (direction toward which the position of the own vehicle is offset with respect to the target travel line Ld) for setting the offset line Ld' with respect to the target travel line Ld. When the change inhibition condition is not satisfied, the road shoulder is formed on at least one of the left and right sides of the own vehicle lane. The driving support ECU 10 sets the direction toward which the offset line Ld' is set with respect to the target travel line Ld to the direction toward which the road shoulder is formed. For example, in the example illustrated in FIG. 7B, the offset line Ld' is set on the left side with respect to the original target travel line Ld (lane center position). Moreover, when road shoulders are formed on both the left and right sides of the own vehicle lane, the offset line Ld' only needs to be set in a prioritized direction (e.g., left side or right side) set in advance.

The driving support ECU 10 sets the direction (direction toward which the vehicle position is offset with respect to the target travel line Ld) of the offset line Ld', and then, in Step S24, sets the control mode of the LKA to the "offset mode". In this case, the driving support ECU 10 calculates the target steering angle θLKA* so that the own vehicle C can travel along this travel line Ld'.

When the offset line Ld' is set in this way, the lane keeping assist performance, which is the performance of traveling along the original target travel line Ld, decreases, and the own vehicle comes to travel along the offset line Ld', which is not desirable for the driver. Therefore, the driver who has not lost the driving capability is prompted to carry out the steering wheel operation. As a result, the driver, who has neglected the steering wheel operation, starts the steering wheel operation, and no longer puts too much confidence in the LKA.

The driver who has not lost the driving capability reacts in some way to the change in the travel state of the own vehicle, for example, by performing the steering wheel operation. For example, an intentional driving operation such as a brake pedal operation or an accelerator pedal operation of the driver may be started. Alternatively, an intentional change in posture of the driver and the like may occur. Thus, it is possible to discriminate the abnormal state where the driver has lost the capability to drive the vehicle and the state where the driver is neglecting the steering wheel operation even when the driver is capable of driving the vehicle from one another based on the presence/absence of the reaction of the driver.

The driving support ECU 10 sets the control mode of the LKA to the "offset mode", then advances the processing to Step S17 to determine whether or not the driver is in the no-driving operation state where the driver does carry out the operations for driving the vehicle. When the driver carries out some driving operation (No in Step S17), the driving support ECU 10 determines that the driver is not in the abnormal state, that is, is in the normal state where the driver has capability to drive the vehicle, and returns the processing to Step S11. In this way, the control mode of the LKA is returned from the "offset mode" to the "normal mode".

On the other hand, when the no-driving operation state continues (Yes in Step S17), in Step S18, the driving support ECU 10 decelerates the own vehicle at the constant deceleration a set in advance to stop.

With the above-mentioned vehicle control device according to the second embodiment, when the no-driving operation state continues for a period equal to or more than the set period, the control mode of the LKA is set to the "offset mode". As a result, the own vehicle travels along the offset line Ld' offset in the road width direction by the offset amount Doff with respect to the target travel line Ld. Thus, even when the driving support control is being carried out, the abnormality determination for the driver can be made based on the presence/absence of the reaction of the driver.

Simultaneously, when the change inhibition condition set in advance in relation to the peripheral state of the own vehicle is determined to be satisfied based on the peripheral state information on the own vehicle, the control mode of the LKA is inhibited from being set to the "offset mode". Thus, the occurrence of such a trouble that the own vehicle deviates from the lane and such a trouble that the own vehicle abnormally approaches another vehicle can be suppressed when the abnormality determination for the driver is made.

In particular, in the second embodiment, when the own vehicle is caused to travel along the offset line Ld', the information representing the positional relationship between the own vehicle lane and another vehicle lane neighboring the own vehicle lane is acquired, and when another vehicle lane is provided on each of the left and right sides of the own vehicle lane, the travel position of the own vehicle is inhibited from being offset from the target travel line Ld. Moreover, when the change inhibition condition is not satisfied, the offset line Ld' is set toward the direction toward which another vehicle lane is not provided. Thus, occurrence of such a trouble that the own vehicle abnormally approaches another vehicle due to the abnormality determination for the driver can be suppressed.

As a result, according to this embodiment, the abnormality determination for the driver can be appropriately made in accordance with the peripheral state.

Moreover, when the driving operation of the driver is detected after the control mode of the LKA is set to the "offset mode", the control mode of the LKA is returned to the "normal mode", and thus the driver can again receive the original driving support by the LKA.

In the above, the vehicle control device according to this embodiment has been described, but the present invention is not limited to the above-mentioned embodiments, and various changes are possible within the range not departing from the object of the present invention.

For example, the change inhibition conditions are not limited to the conditions described in the embodiments, and may be arbitrarily set. In other words, the change inhibition condition only needs to be set to a condition under which a trouble in terms of safety is predicted to occur when the control mode of the LKA is set to the "weaker mode" or the "offset mode".

Moreover, for example, when the no-driving operation state continues for a period equal to or more than a set period, the driver may be warned. In this case, the driving support ECU 10 outputs an abnormality warning command to the alarm ECU 80. When the warning ECU 80 inputs the abnormality warning command, the alarm ECU 80 displays the mark for prompting the holding of the steering wheel SW on the display device 82, and sounds the buzzer 81 at a predetermined cycle.

Moreover, for example, under the state where the own vehicle is being decelerated (Step S18), the lighting of the stop lamps 72 and the flashing of the hazard lamps 71 may be carried out. In this case, the driving support ECU 10 outputs a stop lamp lighting command and a hazard lamp flashing command to the meter ECU 70. When the meter ECU 70 inputs those commands, the meter ECU 70 lights the stop lamps 72, and flashes the hazard lamps 71.

Moreover, for example, when the own vehicle stops (Yes in Step S19), the electric parking brake may be activated, and the door lock device 91 may be unlocked. In this case, the driving support ECU 10 outputs an activation command for the electric parking brake to the electric parking brake ECU 50, and outputs an unlock command for the door lock device 91 to the body ECU 90. As a result, the electric parking brake is brought into an activated state, and the door lock device 91 is brought into an unlocked state. Thus, the own vehicle can be stably maintained in the stop state, and it is possible to open the door to rescue the driver.

Moreover, in this embodiment, while both the LKA and the ACC are carried out, the abnormal-time driving support control routine is executed, but the ACC does not always need to be carried out.

Moreover, in this embodiment, the driver is required to hold the steering wheel SW while the LKA is being carried out, but the vehicle control device may be applied to an automatic driving system that does not require the driver to hold the steering wheel SW. In the automatic driving system, the driver does not need to touch the driving operator, for example, the steering wheel SW while driving the vehicle, but needs to face forward so as to be ready to start the driving operation at any time. Thus, when the state where the driver does not face forward continues for a period equal to or more than a set period, the driver, who is looking away, can be made to face forward by decreasing the lane keeping assist control amount to cause the own vehicle to swerve. Alternatively, the driver, who is looking away, can be made to face forward by offsetting the travel position of the own vehicle in the road width direction from the target travel line Ld. As a result, the abnormality determination for the driver can be made also in the automatic driving system.

What is claimed is:

1. A vehicle control device, comprising:
   lane keeping assist means for recognizing a road ahead of an own vehicle to set a target travel line, calculating a lane keeping assist control amount for carrying out driving support for a driver so that the own vehicle travels along the target travel line, and carrying out steering control for the own vehicle based on the lane keeping assist control amount;
   control amount change means for changing the lane keeping assist control amount so as to decrease lane keeping assist performance, which is performance of causing the own vehicle to travel along the target travel line, when such a set event set in advance that the driver is suspected to be in an abnormal state is detected;
   reaction detection means for detecting a reaction of the driver after the lane keeping assist control amount is changed;
   abnormality-time driving control means for carrying out, when the reaction of the driver is not detected by the reaction detection means, abnormality-time driving control, which is driving control for risk avoidance based on an assumption that the driver is in the abnormal state; and
   control amount change inhibition means for acquiring peripheral state information on the own vehicle, determining whether or not a change inhibition condition set in advance in relation to a peripheral state of the own vehicle is satisfied based on the peripheral state information, and inhibiting the control amount change means from changing the lane keeping assist control amount so as to decrease the lane keeping assist performance when the change inhibition condition is satisfied.

2. A vehicle control device according to claim 1, wherein the control amount change means is configured to finish changing the lane keeping assist control amount when the reaction of the driver is detected by the reaction detection means after the lane keeping assist control amount is changed.

3. A vehicle control device according to claim 1, wherein:
   the peripheral state information comprises information representing a curvature radius of a lane in which the own vehicle travels; and
   the change inhibition condition is set to a condition that the curvature radius of the lane in which the own vehicle travels is less than a threshold value.

4. A vehicle control device according to claim 1, wherein:
   the peripheral state information comprises information representing a distance between left and right white lines of the lane in which the own vehicle travels; and
   the change inhibition condition is set to a condition that the distance between the left and right white lines of the lane in which the own vehicle travels is less than a threshold value.

5. A vehicle control device according to claim 1, wherein:
   the peripheral state information comprises another vehicle information, which is information that enables prediction of whether or not another vehicle exists to a side of the own vehicle; and
   the change inhibition condition is set to a condition that another vehicle is predicted to exist to the side of the own vehicle.

6. A vehicle control device according to claim 1, wherein the control amount change means is configured to decrease, when the set event is detected, the lane keeping assist control amount with respect to the lane keeping assist control amount before the set event is detected.

7. A vehicle control device according to claim 1, wherein the control amount change means is configured to change the lane keeping assist control amount so that a travel position of the own vehicle is offset in a road width direction with respect to the target travel line when the set event is detected.

8. A vehicle control device according to claim 7, wherein:
   the peripheral state information comprises information representing a positional relationship between an own vehicle lane, which is a lane in which the own vehicle travels, and another vehicle lane, which is a lane neighboring the own vehicle lane;
   the change inhibition condition is set to a condition that the another vehicle lane is provided on each of left and right sides of the own vehicle lane; and
   the control amount change means is configured to select a direction toward which the another vehicle lane is not provided, and change the lane keeping assist control amount so that the travel position of the own vehicle is offset toward the selected direction with respect to the target travel line.

* * * * *